(12) United States Patent
Ejima et al.

(10) Patent No.: US 12,196,464 B2
(45) Date of Patent: Jan. 14, 2025

(54) VALVE

(71) Applicant: EAGLE INDUSTRY CO., LTD., Tokyo (JP)

(72) Inventors: Takahiro Ejima, Tokyo (JP); Kenshiro Furukawa, Tokyo (JP); Kohei Fukudome, Tokyo (JP); Keigo Shirafuji, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 18/017,824

(22) PCT Filed: Jul. 27, 2021

(86) PCT No.: PCT/JP2021/027762
§ 371 (c)(1),
(2) Date: Jan. 24, 2023

(87) PCT Pub. No.: WO2022/030309
PCT Pub. Date: Feb. 10, 2022

(65) Prior Publication Data
US 2023/0288110 A1 Sep. 14, 2023

(30) Foreign Application Priority Data
Aug. 3, 2020 (JP) .................... 2020-131959

(51) Int. Cl.
*F25B 41/345* (2021.01)
*B60H 1/00* (2006.01)
(Continued)

(52) U.S. Cl.
CPC ....... *F25B 41/345* (2021.01); *B60H 1/00485* (2013.01); *F16K 1/36* (2013.01); *F16K 17/04* (2013.01)

(58) Field of Classification Search
CPC .......... F16K 17/04; F16K 1/36; F25B 41/345; B60H 1/00485
See application file for complete search history.

(56) References Cited

U.S. PATENT DOCUMENTS

| 813,555 A | 2/1906 | Hayden | ................. F16K 1/34 |
| 821,758 A | 5/1906 | Smith | .................. F16K 1/46 |

(Continued)

FOREIGN PATENT DOCUMENTS

| CN | 107339442 | 11/2017 | .............. F16K 1/02 |
| CN | 110260001 | 9/2019 | ........... F16K 15/016 |

(Continued)

OTHER PUBLICATIONS

International Search Report and Written Opinion and International Preliminary Report on Patentability issued in PCT/JP2021/027769, dated Sep. 7, 2021, 24 pages.

(Continued)

*Primary Examiner* — Jessica Cahill
(74) *Attorney, Agent, or Firm* — HAYES SOLOWAY P.C.

(57) ABSTRACT

To provide a valve capable of suppressing contamination from being caught between a fixed iron core and a rod. The valve includes: a valve housing; a valve body; a valve seat having the valve body seated thereon; a drive source for driving the valve body by a rod; and an urging member for urging the valve body in a direction opposite to a driving direction of the drive source. One of the valve body and the rod includes a guide concave portion which guides remaining one of the valve body and the rod in a relative fitting direction.

16 Claims, 10 Drawing Sheets

(51) Int. Cl.
*F16K 1/36* (2006.01)
*F16K 17/04* (2006.01)

(56) References Cited

U.S. PATENT DOCUMENTS

| | | | | |
|---|---|---|---|---|
| 877,865 | A | 1/1908 | Ricksecker | F16K 1/34 |
| 1,449,876 | A | 3/1923 | Erastus | F01L 3/20 |
| 1,614,002 | A | 1/1927 | Horton | A62C 35/605 |
| 1,758,471 | A | 5/1930 | Julius | F16K 1/46 |
| 1,800,127 | A | 4/1931 | Wilson | F16K 1/34 |
| 1,847,385 | A | 3/1932 | Franklin | F16K 1/34 |
| 2,196,798 | A | 4/1940 | Otto | F16K 1/36 |
| 2,267,515 | A | 12/1941 | Wilcox | F16K 31/0627 |
| 2,887,293 | A | 5/1959 | Fred | F16K 31/60 |
| 2,893,685 | A | 7/1959 | Camp | F16K 1/36 |
| 2,898,082 | A | 8/1959 | Von Almen | F04B 53/1027 |
| 3,049,332 | A | 8/1962 | Webster | F16K 1/02 |
| 3,054,422 | A | 9/1962 | Napolitano | F16K 1/385 |
| 3,070,120 | A | 12/1962 | Wendt | F16K 1/46 |
| 3,185,438 | A | 5/1965 | Smirra | F16K 1/34 |
| 3,204,925 | A | 9/1965 | Enrico | F16K 1/50 |
| 3,230,973 | A | 1/1966 | Rudolf | F16K 1/46 |
| 3,278,156 | A | 10/1966 | Callahan | F16K 41/10 |
| 3,360,304 | A | 12/1967 | Adams | B61K 7/12 |
| 3,394,732 | A | 7/1968 | Constantine | F16K 1/36 |
| 3,426,741 | A | 2/1969 | Haagen | F01L 3/02 |
| 3,483,888 | A | 12/1969 | Hugo | F16K 15/04 |
| 3,679,169 | A | 7/1972 | Bedo | F16K 41/02 |
| 3,854,495 | A * | 12/1974 | Cowley | G05D 16/0663 137/505.44 |
| 4,085,921 | A | 4/1978 | Ueda et al. | F16K 31/06 |
| 4,149,699 | A | 4/1979 | Speckmann | F16K 41/00 |
| 4,318,532 | A | 3/1982 | Winkler | F16K 1/34 |
| 4,345,739 | A | 8/1982 | Wheatley | F16K 1/2263 |
| 4,364,615 | A | 12/1982 | Euler | F16C 27/04 |
| 4,417,601 | A | 11/1983 | Bennett | A62C 31/12 |
| 4,448,038 | A | 5/1984 | Barbier | F25B 41/34 |
| 4,474,356 | A | 10/1984 | Baumann | F16K 1/12 |
| 4,579,145 | A | 4/1986 | Leiber | F16H 61/0251 |
| 4,615,358 | A | 10/1986 | Hammond | F15B 13/0402 |
| 4,617,889 | A | 10/1986 | Nishimiya | F02D 31/00 |
| 4,632,358 | A | 12/1986 | Orth | F25B 41/347 |
| 4,778,150 | A | 10/1988 | Pratt | F16K 41/043 |
| 4,825,909 | A | 5/1989 | Martin | F15B 13/02 |
| 4,848,729 | A | 7/1989 | Danzy | F16K 1/46 |
| 4,895,192 | A | 1/1990 | Mortenson | F01M 11/04 |
| 4,915,355 | A | 4/1990 | Fort | F16K 1/46 |
| 4,917,150 | A | 4/1990 | Koch | F16K 31/0606 |
| 4,922,957 | A | 5/1990 | Johnson | F16K 1/46 |
| 4,923,173 | A | 5/1990 | Szymaszek | F16K 1/36 |
| 4,979,542 | A | 12/1990 | Mesenich | F02M 47/027 |
| 4,998,559 | A | 3/1991 | McAuliffe | F16H 61/0251 |
| 5,011,116 | A | 4/1991 | Alberts | F16K 47/00 |
| 5,060,695 | A | 10/1991 | McCabe | G05D 16/2024 |
| 5,217,047 | A | 6/1993 | McCabe | F16H 16/0251 |
| 5,232,195 | A | 8/1993 | Torrielli | H01F 7/1607 |
| 5,246,205 | A | 9/1993 | Gillingham | F01N 3/0212 |
| 5,263,694 | A | 11/1993 | Smith | B60G 15/068 |
| 5,364,066 | A | 11/1994 | Dorste | F25B 41/35 |
| 5,439,027 | A | 8/1995 | Layton | F16K 1/385 |
| 5,702,235 | A | 12/1997 | Hirota | F04B 27/1804 |
| 5,778,932 | A | 7/1998 | Alexander | G05D 16/2024 |
| 6,010,312 | A | 1/2000 | Suitou | F04B 27/1804 |
| 6,155,391 | A | 12/2000 | Kashiwagi et al. | F16F 9/348 |
| 6,161,585 | A | 12/2000 | Kolchinsky | F05D 16/2024 |
| 6,257,836 | B1 | 7/2001 | Ota et al. | 417/222.02 |
| 6,315,266 | B1 * | 11/2001 | Hirota | F16K 31/406 251/30.01 |
| 6,361,283 | B1 | 3/2002 | Ota | F04B 27/1084 |
| 6,481,976 | B2 | 11/2002 | Kimura | F04B 27/1804 |
| 6,776,182 | B2 | 8/2004 | Ishitoya | F16K 25/00 |
| 6,811,140 | B1 | 11/2004 | Maini | F16K 1/46 |
| 6,840,504 | B2 | 1/2005 | Hagiwara | F16K 1/36 |
| 6,959,718 | B2 | 11/2005 | Kayahara | F16K 31/0655 |
| 7,007,917 | B2 | 3/2006 | Choi | F16K 31/0655 |
| 7,040,595 | B2 | 5/2006 | Hirota | F16K 31/02 |
| 7,481,417 | B2 | 1/2009 | Mayer | F16K 51/02 |
| 7,533,687 | B2 | 5/2009 | Uemura | F16K 27/048 |
| 7,726,949 | B2 | 6/2010 | Taguchi | F04B 1/26 |
| 7,758,014 | B2 | 7/2010 | Lancaster | F16K 1/04 |
| 7,832,653 | B2 | 11/2010 | Yukimoto | F25B 41/39 |
| 7,971,797 | B2 | 7/2011 | Habermann | F16K 31/002 |
| 8,021,124 | B2 | 9/2011 | Umemura | F04B 27/1804 |
| 8,079,827 | B2 | 12/2011 | Iwa | F04B 27/1804 |
| 8,128,061 | B2 * | 3/2012 | Uemura | F04B 27/1804 251/129.15 |
| 8,225,818 | B1 | 7/2012 | Stephens | F15B 13/0442 |
| 8,328,163 | B2 | 12/2012 | Boesch | F16K 1/36 |
| 8,387,947 | B2 * | 3/2013 | Uemura | F04B 27/1804 251/129.15 |
| 8,469,337 | B1 | 6/2013 | Hoeptner | F16K 1/36 |
| 8,579,257 | B2 | 11/2013 | Taylor | F16K 1/46 |
| 8,651,826 | B2 | 2/2014 | Futakuchi | F04B 27/1804 |
| 8,684,037 | B2 | 4/2014 | Huynh | F15B 13/01 |
| 9,022,346 | B2 | 5/2015 | Najmolhoda | F16K 31/0613 |
| 9,027,598 | B2 | 5/2015 | Schneider | F16K 31/0613 |
| 9,132,714 | B2 | 9/2015 | Futakuchi | F04B 27/1804 |
| 9,243,733 | B2 | 1/2016 | Lively | G05D 16/02 |
| 9,297,373 | B2 | 3/2016 | Bagagli | B16K 15/026 |
| 9,383,021 | B2 | 7/2016 | Kosmehl | F16K 1/36 |
| 9,400,027 | B2 | 7/2016 | Imaizumi | F16F 1/32 |
| 9,453,518 | B2 | 9/2016 | Schulz | F15B 13/043 |
| 9,470,337 | B2 | 10/2016 | Roper | F16K 1/36 |
| 9,581,149 | B2 | 2/2017 | Ota et al. | F04B 27/1804 |
| 9,581,150 | B2 | 2/2017 | Ota et al. | F04B 27/1804 |
| 9,638,082 | B2 | 5/2017 | Fujita | F16K 25/00 |
| 9,732,874 | B2 | 8/2017 | Saeki | F16K 31/0603 |
| 9,874,286 | B2 | 1/2018 | Bagagli | F16K 15/12 |
| 10,113,539 | B2 | 10/2018 | Sugamura | F04B 27/1804 |
| 10,378,657 | B2 | 8/2019 | Lin | F16K 1/46 |
| 10,519,944 | B2 | 12/2019 | Taguchi | F04B 27/1804 |
| 10,557,463 | B2 | 2/2020 | Sugamura | F04B 27/1804 |
| 10,690,125 | B2 | 6/2020 | Hayama | F04B 27/18 |
| 10,784,804 | B2 | 9/2020 | Sasaki | H02P 25/022 |
| 10,837,431 | B2 | 11/2020 | Tonegawa | F04B 49/22 |
| 11,085,431 | B2 | 8/2021 | Fukudome et al. | F16K 31/06 |
| 11,092,244 | B1 | 8/2021 | Hu | F16K 1/36 |
| 2001/0003573 | A1 | 6/2001 | Kimura et al. | 417/222.2 |
| 2002/0134444 | A1 | 9/2002 | Isobe | F16K 27/041 |
| 2003/0145615 | A1 | 8/2003 | Sasaki | F16K 31/0637 |
| 2003/0197141 | A1 | 10/2003 | Kajitani | F16L 47/00 |
| 2003/0202885 | A1 | 10/2003 | Taguchi | F04B 49/00 |
| 2004/0045305 | A1 | 3/2004 | Murase | F25B 49/022 |
| 2004/0165994 | A1 | 8/2004 | Umemura | F04B 27/1804 |
| 2005/0076959 | A1 | 4/2005 | Yamamoto | F16K 31/0624 |
| 2005/0151310 | A1 | 7/2005 | Rodeffer | F16F 1/32 |
| 2005/0163624 | A1 | 7/2005 | Taguchi | F04B 27/1804 |
| 2007/0214814 | A1 | 9/2007 | Umemura et al. | |
| 2007/0264134 | A1 | 11/2007 | Hirota | F04B 27/1804 |
| 2008/0138213 | A1 | 6/2008 | Umemura et al. | 417/222.2 |
| 2008/0175727 | A1 | 7/2008 | Umemura et al. | F04B 49/22 |
| 2009/0108221 | A1 | 4/2009 | Umemura et al. | 251/129.15 |
| 2009/0114871 | A1 | 5/2009 | Iwa | F04B 27/14 |
| 2009/0183786 | A1 | 7/2009 | Iwa | 137/487.5 |
| 2009/0256091 | A1 | 10/2009 | Nordstrom | F16K 31/0613 |
| 2010/0019406 | A1 | 1/2010 | Shoji et al. | F16K 1/34 |
| 2010/0051838 | A1 * | 3/2010 | Uemura | F04B 27/1804 251/84 |
| 2010/0282991 | A1 | 11/2010 | Okamoto | F16K 31/02 |
| 2011/0041941 | A1 | 2/2011 | Sonsterod | F16K 15/14 |
| 2011/0061749 | A1 | 3/2011 | Okamoto | F16K 31/0655 |
| 2011/0089352 | A1 | 4/2011 | Morgan | F16K 11/0716 |
| 2011/0203888 | A1 | 8/2011 | Sonsterod | F16F 9/32 |
| 2012/0056113 | A1 | 3/2012 | Tano | F04B 27/1804 |
| 2012/0198992 | A1 * | 8/2012 | Futakuchi | F04B 27/1804 91/505 |
| 2012/0198993 | A1 * | 8/2012 | Fukudome | F04B 27/1804 91/505 |
| 2012/0211686 | A1 | 8/2012 | Okamoto | F16K 31/0655 |
| 2013/0291963 | A1 | 11/2013 | Futakuchi et al. | 137/487.5 |
| 2014/0099214 | A1 | 4/2014 | Fukudome | 417/222.2 |
| 2014/0109973 | A1 * | 4/2014 | Neumeister | C23C 16/4412 137/1 |
| 2014/0130916 | A1 | 5/2014 | Saeki | F16K 31/0613 |

(56) References Cited

U.S. PATENT DOCUMENTS

| | | | |
|---|---|---|---|
| 2014/0294632 A1 | 10/2014 | Kondo et al. | 417/434 |
| 2014/0369862 A1 | 12/2014 | Ota et al. | F04B 27/1804 |
| 2015/0004010 A1 | 1/2015 | Saeki | F04B 27/1804 |
| 2015/0021131 A1 | 1/2015 | Wootten | F16F 9/348 |
| 2015/0027573 A1 | 1/2015 | Ochiai | F15B 13/0402 |
| 2015/0044067 A1 | 2/2015 | Ota et al. | F04B 27/1804 |
| 2015/0068628 A1 | 3/2015 | Iwa | 137/625.65 |
| 2015/0104334 A1 | 4/2015 | Ota et al. | F04B 27/1804 |
| 2015/0275874 A1 | 10/2015 | Ota | F04B 27/1804 |
| 2015/0276065 A1 | 10/2015 | Yoshida | F16K 3/246 |
| 2015/0345655 A1 | 12/2015 | Higashidozono | 137/624.27 |
| 2016/0053755 A1 | 2/2016 | Taguchi | F04B 49/22 |
| 2016/0290326 A1 | 10/2016 | Sugamura | F04B 27/1804 |
| 2017/0261113 A1* | 9/2017 | Sato | F16K 31/0675 |
| 2017/0284562 A1 | 10/2017 | Hayama | F16K 41/00 |
| 2018/0156345 A1 | 6/2018 | Kanda | F15B 13/0431 |
| 2018/0187793 A1 | 7/2018 | Futakuchi | F04B 39/08 |
| 2018/0238455 A1 | 8/2018 | Yazawa | F16K 31/508 |
| 2018/0291888 A1 | 10/2018 | Tonegawa et al. | F04B 49/22 |
| 2019/0162175 A1 | 5/2019 | Higashidozono | F04B 27/18 |
| 2020/0032781 A1 | 1/2020 | Higashidozono | F16K 31/0624 |
| 2020/0088178 A1 | 3/2020 | Fukudome et al. | F16K 31/06 |
| 2020/0173580 A1 | 6/2020 | Sandeck | F16K 51/02 |
| 2020/0309105 A1 | 10/2020 | Hayama et al. | F04B 27/18 |
| 2020/0318624 A1 | 10/2020 | Hayama | F04B 27/18 |
| 2020/0325881 A1 | 10/2020 | Hayama et al. | F04B 27/18 |
| 2020/0332786 A1 | 10/2020 | Hayama | F04B 27/18 |
| 2020/0362974 A1 | 11/2020 | Hayama et al. | F16K 11/24 |
| 2020/0370545 A1 | 11/2020 | Hayama et al. | F04B 27/18 |
| 2021/0372396 A1 | 12/2021 | Kurihara | G05D 7/0635 |
| 2021/0404570 A1 | 12/2021 | Hayama et al. | F16K 17/04 |

FOREIGN PATENT DOCUMENTS

| | | | |
|---|---|---|---|
| CN | 111279076 | 6/2020 | F04B 27/18 |
| CN | 111316028 | 6/2020 | F16K 31/06 |
| CN | 111417780 | 7/2020 | F04B 27/18 |
| EP | 0229315 | 7/1987 | F02M 3/07 |
| EP | 2594794 | 5/2013 | F04B 27/18 |
| EP | 3296599 | 3/2018 | F16K 1/34 |
| EP | 3366957 | 8/2018 | F16K 1/34 |
| EP | 3726054 | 10/2020 | F04B 27/18 |
| JP | 5682358 | 7/1981 | G03B 15/00 |
| JP | 5740945 | 8/1982 | B21B 39/14 |
| JP | H04171361 | 6/1992 | F04B 49/00 |
| JP | 5346276 | 12/1993 | F25B 41/96 |
| JP | 626454 | 2/1994 | F04B 27/08 |
| JP | H0711313 | 2/1995 | F16K 1/34 |
| JP | H8159320 | 6/1996 | F16K 31/04 |
| JP | H10220926 | 8/1998 | F25B 41/06 |
| JP | 11287281 | 10/1999 | F16F 9/348 |
| JP | 200020763 | 8/2000 | F16K 31/06 |
| JP | 2000304152 | 11/2000 | F16D 48/02 |
| JP | 2001012534 | 1/2001 | F16F 9/46 |
| JP | 2001153495 | 6/2001 | F16K 31/06 |
| JP | 2001153498 | 6/2001 | F16K 31/06 |
| JP | 2001165055 | 6/2001 | F04B 27/14 |
| JP | 2002216803 | 8/2002 | H01M 8/02 |
| JP | 2003004160 | 1/2003 | F16K 31/04 |
| JP | 2003301772 | 10/2003 | |
| JP | 2003314745 | 11/2003 | F16K 51/02 |
| JP | 2003322086 | 11/2003 | F04B 49/00 |
| JP | 2004003468 | 1/2004 | F04B 27/14 |
| JP | 2004101163 | 4/2004 | F25B 41/06 |
| JP | 2005307817 | 11/2005 | F04B 27/14 |
| JP | 2005351605 | 12/2005 | F16K 1/38 |
| JP | 2006153204 | 6/2006 | F16K 31/04 |
| JP | 2007247512 | 9/2007 | F04B 27/14 |
| JP | 2008157031 | 7/2008 | F04B 27/14 |
| JP | 2008190574 | 8/2008 | F16K 31/06 |
| JP | 2009030752 | 2/2009 | F16K 31/06 |
| JP | 2009115204 | 5/2009 | F16K 31/04 |
| JP | 2009221965 | 10/2009 | F04B 27/14 |
| JP | 2009275550 | 11/2009 | F04B 49/00 |
| JP | 2010019406 | 1/2010 | F16K 31/04 |
| JP | 2011501798 | 1/2011 | F16K 15/14 |
| JP | 2011525962 | 9/2011 | F16F 9/32 |
| JP | 4822735 | 11/2011 | A43B 23/24 |
| JP | 2012144986 | 8/2012 | F04B 27/14 |
| JP | 2012211579 | 11/2012 | F04B 27/14 |
| JP | 2013024135 | 2/2013 | F04B 27/14 |
| JP | 5167121 | 3/2013 | F04B 27/14 |
| JP | 2013100915 | 5/2013 | F15K 31/06 |
| JP | 2014080927 | 5/2014 | F04B 27/16 |
| JP | 2014092207 | 5/2014 | F16K 31/06 |
| JP | 2014095463 | 5/2014 | F16K 31/06 |
| JP | 2014194180 | 10/2014 | F04B 27/14 |
| JP | 2015075054 | 4/2015 | F04B 27/14 |
| JP | 20151168 | 5/2015 | F04B 27/14 |
| JP | 2015137546 | 7/2015 | F04B 27/14 |
| JP | 2015178795 | 10/2015 | F04B 27/14 |
| JP | 5983539 | 8/2016 | F04B 27/18 |
| JP | 2016196825 | 11/2016 | F04B 27/18 |
| JP | 2016196876 | 11/2016 | F04B 27/18 |
| JP | 2016205404 | 12/2016 | F04B 27/18 |
| JP | 6135521 | 5/2017 | F04B 27/18 |
| JP | 2017089832 | 5/2017 | F16K 31/06 |
| JP | 2017180525 | 10/2017 | F16K 31/04 |
| JP | 2018015739 | 2/2018 | C02F 1/46 |
| JP | 2018035840 | 5/2018 | |
| JP | 2018115684 | 7/2018 | B60G 17/08 |
| JP | 2018135954 | 8/2018 | F16K 31/06 |
| JP | 2018179087 | 11/2018 | F16K 31/06 |
| JP | 2019131725 | 8/2019 | |
| JP | 2019138473 | 8/2019 | F16K 1/36 |
| JP | 2019167982 | 10/2019 | F16K 1/38 |
| JP | 2020041606 | 3/2020 | F16K 1/44 |
| WO | WO2006090760 | 8/2006 | F04B 27/18 |
| WO | WO2007119380 | 10/2007 | F04B 27/14 |
| WO | WO2009025298 | 2/2009 | F16K 31/06 |
| WO | WO2011114841 | 9/2011 | F04B 27/14 |
| WO | WO2011132438 | 10/2011 | F16K 31/06 |
| WO | WO2012077439 | 6/2012 | F04B 27/14 |
| WO | WO2014119594 | 8/2014 | F04B 27/14 |
| WO | WO2014148367 | 9/2014 | F16K 31/06 |
| WO | WO2018124156 | 7/2018 | F16K 31/06 |
| WO | WO2019131482 | 7/2019 | F04B 27/18 |
| WO | WO2020110925 | 11/2019 | F04B 27/18 |

OTHER PUBLICATIONS

International Search Report and Written Opinion and International Preliminary Report on Patentability issued in PCT/JP2021/027762, dated Oct. 5, 2021, 20 pages.

International Search Report and Written Opinion and International Preliminary Report on Patentability issued in PCT/JP2021/027766, dated Sep. 7, 2021, 24 pages.

International Search Report and Written Opinion and International Preliminary Report on Patentability issued in PCT/JP2021/027770, dated Oct. 5, 2021, 20 pages.

International Search Report and Written Opinion and International Preliminary Report on Patentability issued in PCT/JP2021/027772, dated Sep. 21, 2021, 24 pages.

International Search Report and Written Opinion and International Preliminary Report on Patentability issued in PCT/JP2021/027767, dated Sep. 7, 2021, 22 pages.

International Search Report and Written Opinion and International Preliminary Report on Patentability issued in PCT/JP2021/030007, dated Nov. 2, 2021, 18 pages.

International Search Report and Written Opinion and International Preliminary Report on Patentability issued in PCT/JP2021/034996, dated Dec. 12, 2021, 18 pages.

International Search Report and Written Opinion and International Preliminary Report on Patentability issued in PCT/JP2021/034990, dated Oct. 19, 2021, 18 pages.

International Search Report and Written Opinion and International Preliminary Report on Patentability issued in PCT/JP2021/034995, dated Dec. 14, 2021, 16 pages.

International Search Report and Written Opinion and International Preliminary Report on Patentability issued in PCT/JP2022/012340, dated May 31, 2022, 24 pages.

(56) References Cited

OTHER PUBLICATIONS

U.S. Appl. No. 18/019,057, filed Jan. 31, 2023, Fukudome et al.
U.S. Appl. No. 18/019,230, filed Feb. 1, 2023, Fukudome et al.
U.S. Appl. No. 18/019,060, filed Jan. 31, 2023, Kanzaki et al.
U.S. Appl. No. 18/019,066, filed Jan. 31, 2023, Kanzaki et al.
U.S. Appl. No. 18/017,825, filed Jan. 24, 2023, Hayama et al.
U.S. Appl. No. 18/017,824, filed Jan. 24, 2023, Ejima et al.
U.S. Appl. No. 18/029,063, filed Mar. 28, 2023, Higashidozono et al.
U.S. Appl. No. 18/029,065, filed Mar. 28, 2023, Higashidozono.
Official Action issued in European related Application Serial No. 21853139.0, dated Mar. 22, 2024, 15 pages.
Official Action issued in US related U.S. Appl. No. 18/019,230, dated Apr. 25, 2024, 11 pages.
Official Action issued in US related U.S. Appl. No. 18/019,066, dated Apr. 24, 2024, 6 pages.
Official Action issued in US related U.S. Appl. No. 18/029,065, dated Apr. 23, 2024, 14 pages.
Official Action issued in US related U.S. Appl. No. 18/017,825, dated Apr. 15, 2024, 15 pages.
Official Action issued in US related U.S. Appl. No. 18/019,060, dated Apr. 26, 2024, 6 pages.
Notice of Allowance issued in US related U.S. Appl. No. 18/022,465, dated Apr. 25, 2024, 7 pages.

* cited by examiner

VALVE

TECHNICAL FIELD

The present invention relates to a valve which variably controls a hydraulic fluid and, for example, a valve used in an air conditioning system.

BACKGROUND ART

An air conditioning system has a refrigeration cycle which mainly includes a compressor compressing a refrigerant to become superheated steam, a condenser cooling the refrigerant sent from the compressor to become a super-cooled liquid, an expansion valve expanding the refrigerant sent from the condenser to become moist steam, and an evaporator heating the refrigerant sent from the expansion valve to become saturated steam and in which the refrigerant circulates in order of the compressor, the condenser, the expansion valve, and the evaporator.

For example, a valve of Patent Citation 1 is an electronic expansion valve and includes an urging means for urging a valve body in a valve closing direction with respect to a valve seat and a solenoid which is a drive source driving the valve body in a valve opening direction against the urging force of the urging means. The solenoid includes a coil, a bottomed sleeve which is disposed in a through-hole of the coil, a fixed iron core which is disposed inside the sleeve, a movable iron core which is disposed on a bottom surface side inside the sleeve, and a rod which is fixed to the movable iron core and is inserted through a through-hole of the fixed iron core. Further, the urging means urging the valve body in the valve closing direction comes into contact with one axial end surface of the valve body and a front end surface of the rod comes into contact with the other axial end surface. Accordingly, the valve opening degree is adjusted in accordance with a current applied to the solenoid and the flow rate of the refrigerant passing between the valve body and the valve seat can be controlled.

CITATION LIST

Patent Literature

Patent Citation 1: JP 2004-101163 A (pages 5 and 6, FIG. 1)

SUMMARY OF INVENTION

Technical Problem

Since the valve of Patent Citation 1 has a structure in which a primary pressure of the refrigerant is applied to one axial end surface of the valve body in the valve closing direction, a secondary pressure lower than the primary pressure is applied to the other axial end surface in the valve opening direction, and the valve opening degree is slightly adjusted by a differential pressure between the primary pressure and the secondary pressure, it is possible to obtain a desired flow rate of the refrigerant in accordance with the current applied to the solenoid. However, since the rod is guided by a bearing and a gap between the bearing and the rod is very narrow, there is concern that contamination flows between the bearing and the rod to be caught therein.

The present invention has been made by focusing on such a problem and an object of the present invention is to provide a valve capable of suppressing contamination from being caught between a fixed iron core and a rod.

Solution to Problem

In order to solve the foregoing problem, a valve according to the present invention includes: a valve housing; a valve body; a valve seat configured to have the valve body seated thereon; a drive source configured to drive the valve body through a rod; and an urging member configured to urge the valve body in a direction opposite to a driving direction of the drive source, wherein one of the valve body and the rod includes a guide concave portion configured to guide remaining one of the valve body and the rod in a relative fitting direction in which the valve body and the rod are fitted to each other. According to the aforesaid feature of the present invention, since the rod or the valve body is guided in the fitting direction by the guide concave portion when the rod strokes toward the valve body, it is possible to maintain the radial deviation of the valve body with respect to the valve seat in an allowable range while ensuring the gap between the fixed iron core and the rod. Accordingly, it is possible to suppress contamination from being caught between the fixed iron core and the rod.

It may be preferable that the guide concave portion includes an inclined surface. According to this preferable configuration, the rod is relatively and smoothly guided with respect to the valve body and the guide concave portion can be simply formed.

It may be preferable that the remaining one of the valve body and the rod includes a guided convex portion which is fitted to the guide concave portion. According to this preferable configuration, the remaining one of the valve body and the rod can be smoothly guided. Further, it is possible to obtain a compact configuration in which the valve body and the rod are fitted to each other. Therefore, it is possible to reduce the influence on the flow of the fluid by the relative movement between the valve body and the rod.

It may be preferable that each of the guide concave portion and the guided convex portion includes an inclined surface. According to this preferable configuration, it is possible to enable the accurate relative alignment between the axis of the guide concave portion and the axis of the guided convex portion.

It may be preferable that the inclined surface of the guide concave portion and the inclined surface of the guided convex portion are equal to each other in inclination angle with respect to an axial direction. According to this preferable configuration, it is possible to enable the accurate relative alignment between the axis of the guide concave portion and the axis of the guided convex portion. Further, since the inclined surfaces can come into surface contact with each other, it is possible to easily transmit the driving force of the drive source to the valve body.

It may be preferable that each of the inclined surfaces of the guide concave portion and the guided convex portion is part of a spherical surface defined by one mutual curvature. According to this preferable configuration, it is possible to enable the accurate relative alignment between the axis of the guide concave portion and the axis of the guided convex portion. Further, since the inclined surfaces can come into surface contact with each other, it is possible to easily transmit the driving force of the drive source to the valve body.

It may be preferable that each of the guide concave portion and the guided convex portion includes a flat surface which is orthogonal to an axial direction. According to this preferable configuration, since the flat surfaces come into contact with each other, a force is easily transmitted from the rod to the valve body.

It may be preferable that the valve further includes a spring configured to urge the rod toward the valve body. According to this preferable configuration, since the rod is pressed against the valve body by the spring, it is possible to maintain a state in which the rod and the valve body are fitted to each other by the guide concave portion.

DESCRIPTION OF EMBODIMENTS

Modes for carrying out a valve according to the present invention will be described below with reference to embodiments.

First Embodiment

An expansion valve which is a valve according to a first embodiment of the present invention will be described with reference to FIGS. 1 to 5. In addition, the embodiment will be described by exemplifying the expansion valve, but can be also applied to other applications. Hereinafter, the left and right sides when viewed from the front side of FIG. 2 will be described as the left and right sides of the expansion valve. Specifically, the left side of the paper surface in which a valve housing 10 of FIG. 2 is disposed will be described as the left side of the expansion valve and the right side of the paper surface in which a solenoid 80 is disposed as a drive source will be described as the right side of the expansion valve.

Figure 1:
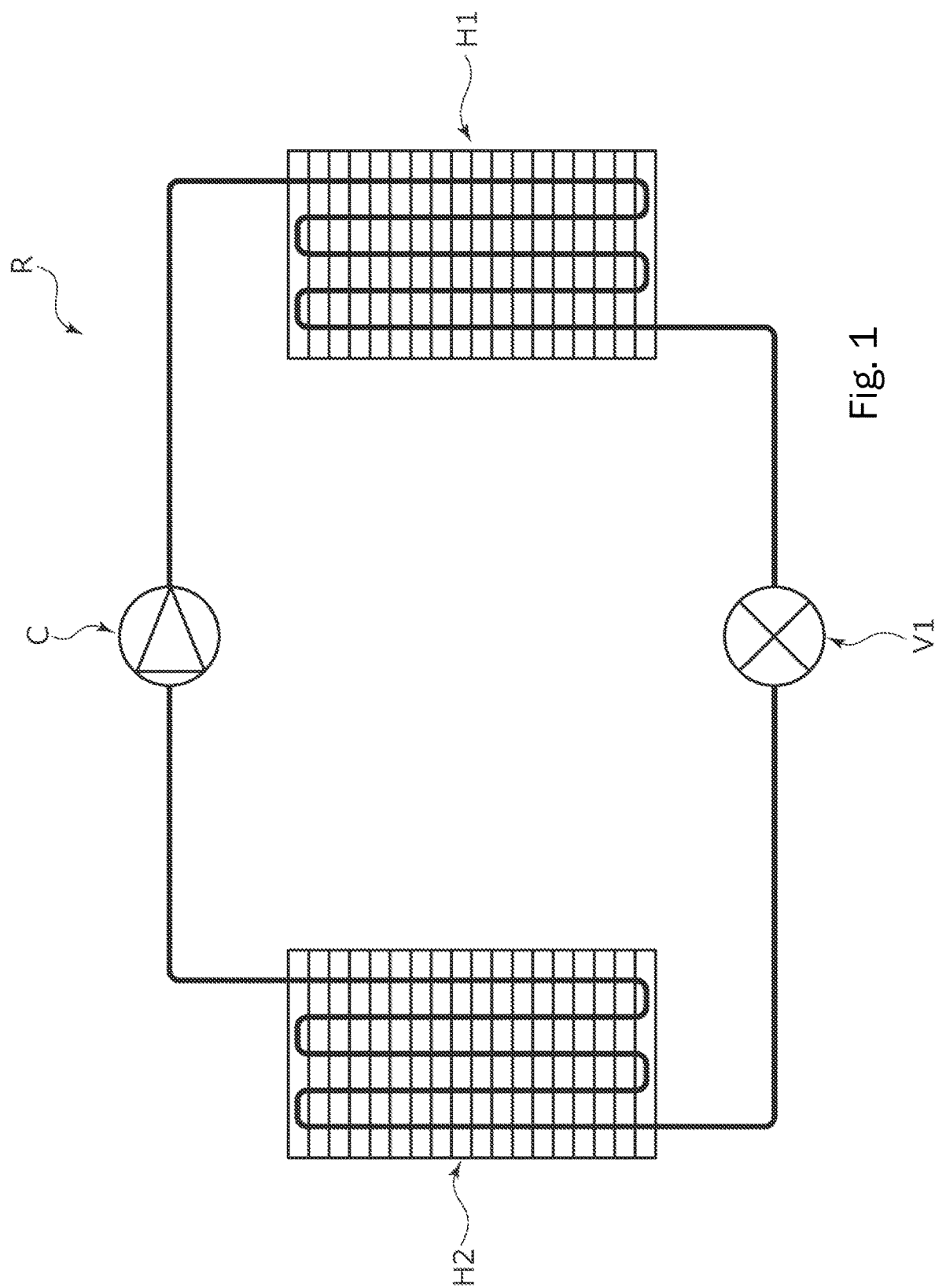
FIG. 1 is a schematic diagram showing a refrigeration cycle that adopts an expansion valve as a valve according to a first embodiment of the present invention.
Figure 2:
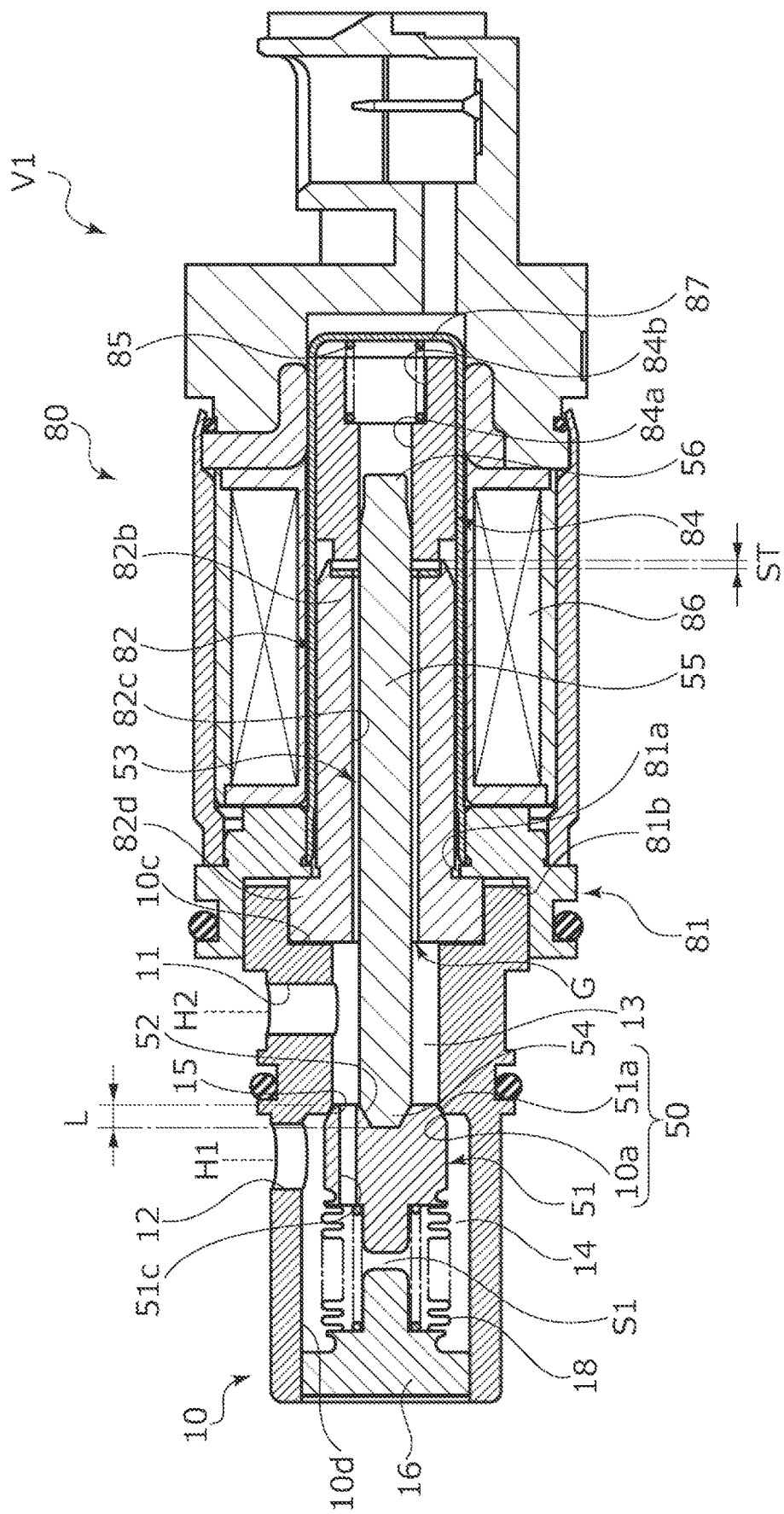
FIG. 2 is a cross-sectional view showing a valve closed state of the expansion valve in the first embodiment of the present invention.

As shown in FIG. 1, an expansion valve V1 of the present invention constitutes a refrigeration cycle R used in an air conditioning system of an automobile or the like together with a compressor C, an indoor heat exchanger H1, an outdoor heat exchanger H2, and the like.

First, the refrigeration cycle R will be described. The refrigeration cycle R is configured to circulate the refrigerant in order of the compressor C, the heat exchanger H1, the expansion valve V1, and the heat exchanger H2 in a heating mode. The refrigerant becomes superheated steam by the compressor C, becomes a supercooled liquid by the heat exchange with the indoor air using the heat exchanger H1, becomes moist steam by being depressurized from a high-pressure primary pressure to a low-pressure secondary pressure using the expansion valve V1, and becomes saturated steam by the heat exchange with the outdoor air using the heat exchanger H2. Accordingly, the indoor air is heated by the heat exchange with the heat exchanger H1. That is, in the heating mode, the heat exchanger H1 serves as a condenser and the heat exchanger H2 serves as an evaporator.

Further, the refrigeration cycle R is configured to circulate the refrigerant in order of the compressor C, the heat exchanger H2, the expansion valve V1, and the heat exchanger H1 in a cooling mode. The refrigerant becomes superheated steam by the compressor C, becomes a supercooled liquid by the heat exchange with the outdoor air using the heat exchanger H2, becomes moist steam by being depressurized from a high-pressure primary pressure to a low-pressure secondary pressure using the expansion valve V1, and becomes saturated steam by the heat exchange with the indoor air using the heat exchanger H1. Accordingly, the indoor air is cooled by the heat exchange with the heat exchanger H1. That is, in the cooling mode, the heat exchanger H1 serves as an evaporator and the heat exchanger H2 serves as a condenser.

In addition, in the following description, the refrigeration cycle R is used for heating unless otherwise specified. Similarly, the heat exchanger H1 is referred to as a condenser H1 and the heat exchanger H2 is referred to as an evaporator H2 on the basis of the heating mode.

Referring to FIG. 2, the expansion valve V1 is disposed between the condenser H1 and the evaporator H2. On the basis of the temperature difference of the refrigerants at the inlet side and the outlet side of the evaporator H2, a current flowing through a coil 86 constituting the solenoid 80 is set and the valve opening degree of the expansion valve V1 is adjusted. Accordingly, when the refrigerant passes through a valve 50, the pressure is adjusted from the high-pressure primary pressure to the relatively low-pressure secondary pressure and the temperature is adjusted from the high temperature to the low temperature. Accordingly, all refrigerants which are supercooled liquids sent from the condenser H1 are adjusted to the dryness of the moist steam that can transition to the saturated steam after passing through the evaporator H2.

In this embodiment, the valve 50 includes a valve body 51 and a valve seat 10a. The valve seat 10a is formed on the inner peripheral surface of the valve housing 10. When a tapered surface portion 51a formed at the right end portion of the valve body 51 in the axial direction comes into contact with and separates from the valve seat 10a, the valve 50 is opened and closed.

Next, the structure of the expansion valve V1 will be described. As shown in FIG. 1, the expansion valve V1 mainly includes the valve housing 10, the valve body 51, and the solenoid 80. The valve housing 10 is integrally formed of a metal material or a resin material. The valve body 51 has an axial left end portion disposed inside the valve housing 10. The solenoid 80 is connected to the valve housing 10 and is used for applying a driving force to the valve body 51.

Figure 3:
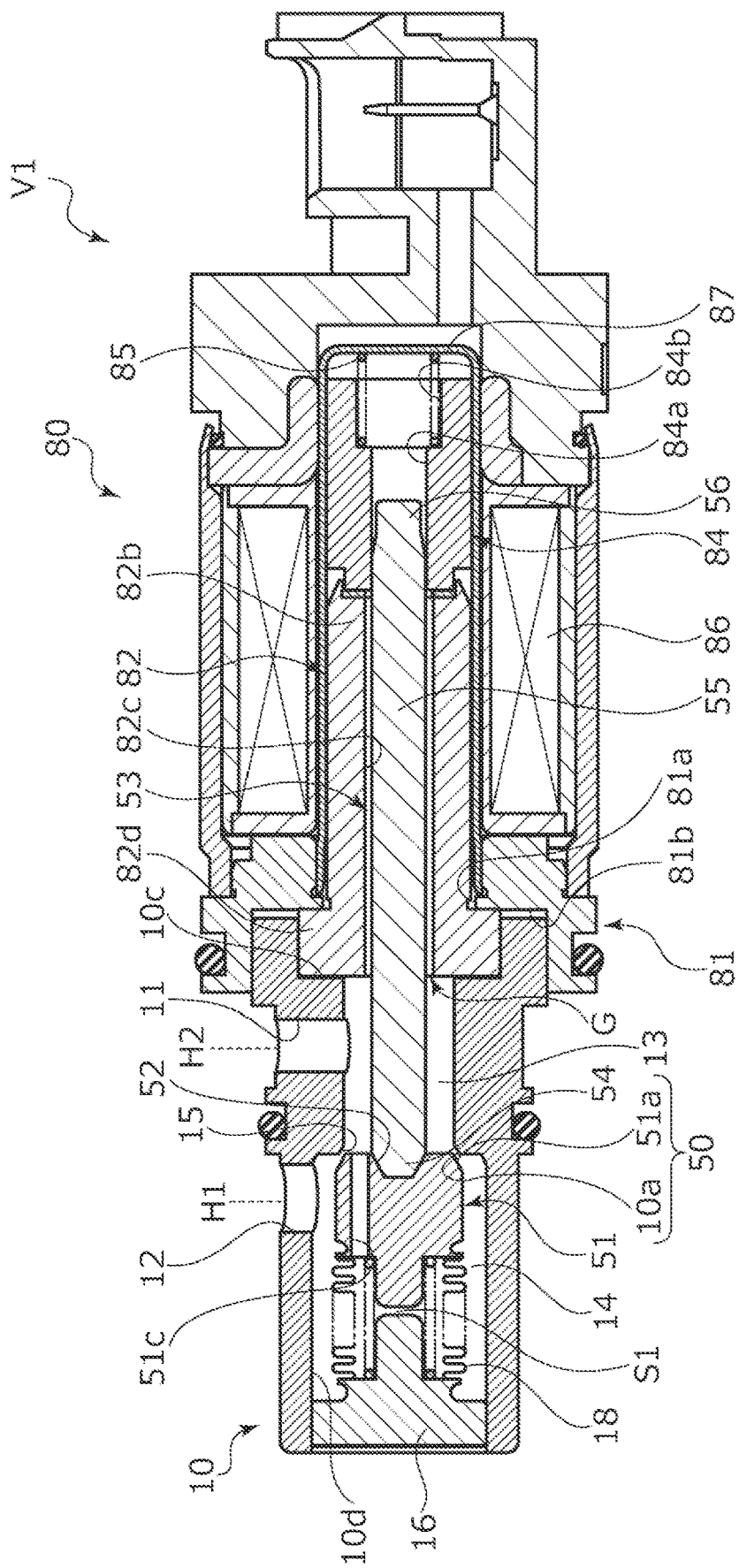
FIG. 3 is a cross-sectional view showing a expansion valve opened state in the first embodiment.

As shown in FIGS. 2 and 3, the valve housing 10 is provided with an outlet port 11 and an inlet port 12. The outlet port 11 communicates with the evaporator H2 and is formed on the axial right side in relation to the valve seat 10a, that is, the valve closing direction side. Further, the inlet port 12 communicates with the condenser H1 and is formed on the axial left side in relation to the valve seat 10a, that is, the valve opening direction side.

A primary pressure chamber 14, a secondary pressure chamber 13, a valve opening portion 15, and a concave portion 10d are provided inside the valve housing 10. The primary pressure chamber 14 receives the refrigerant having passed through the condenser H1 from the inlet port 12. The secondary pressure chamber 13 receives the refrigerant having passed through the valve 50 from the primary pressure chamber 14 and communicates with the outlet port 11. The valve opening portion 15 is disposed between the secondary pressure chamber 13 and the primary pressure chamber 14 and the valve seat 10a is formed at the edge portion on the axial left side. The concave portion 10d is disposed on the axial left side in relation to the valve seat 10a and constitutes the primary pressure chamber 14.

In the concave portion 10d, an opening portion provided on the axial left side is closed by a lid member 16. Further, a bellows 18 which is an urging member for urging the valve body 51 toward the axial right side which is the valve closing direction is disposed in the primary pressure chamber 14. The bellows 18 includes a bellows core and a push spring. The bellows core constitutes an outer shell of the bellows 18. The push spring is contained in the bellows core and urges the valve body 51 in the direction in which the push spring extends, that is, the valve closing direction. In the bellows core, the axial left end is hermetically fixed to the lid member 16 and the axial right end is hermetically fixed to the axial left end surface of the valve body 51. Further, a space S1 is formed inside the bellows core. In the bellows, a member such as a push spring that applies the urging force to the bellows core may be omitted in addition to the bellows core as long as the bellows core itself has an urging force.

Further, the space S1 communicates with the secondary pressure chamber 13 through a communication path 51c in the valve body 51. Accordingly, the refrigerant inside the secondary pressure chamber 13 flows into the space S1. That is, the bellows 18 hermetically defines the space S1 and the primary pressure chamber 14 in the closed state of the valve 50.

Further, the axial right end of the valve housing 10 is provided with a concave portion 10c which is recessed toward the axial left side and a flange portion 82d of a center post 82 is inserted from the axial right side to be integrally and substantially hermetically connected and fixed thereto. In addition, an opening end on the side of the solenoid 80 in the secondary pressure chamber 13 is formed on the inner radial side of the bottom surface of the concave portion 10c of the valve housing 10.

Figure 4:
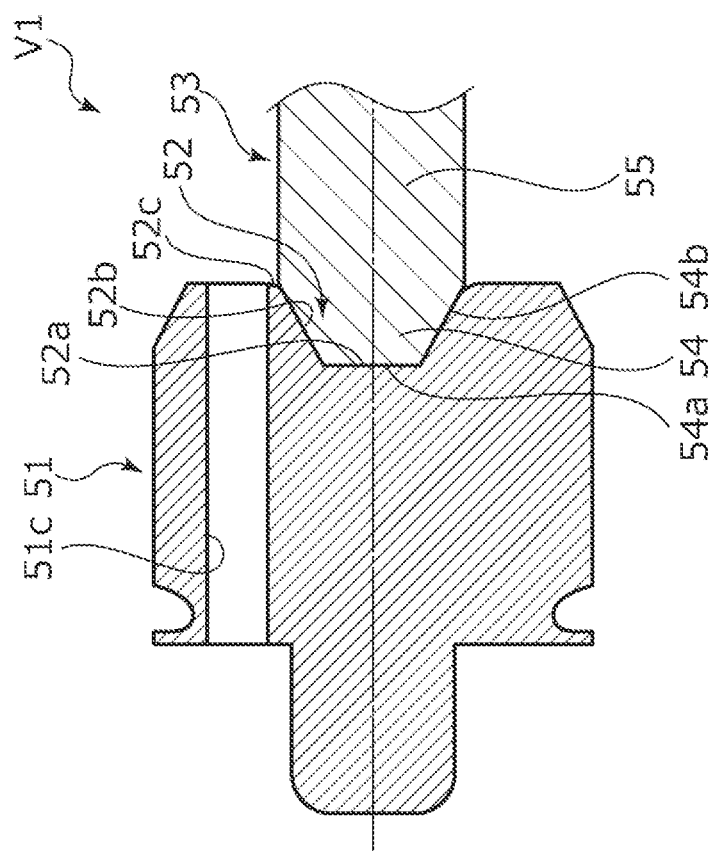
FIG. 4 is an enlarged cross-sectional view of a main part of the expansion valve in the first embodiment.

As shown in FIG. 4, the valve body 51 is provided with a concave portion 52 which is a guide concave portion and a communication path 51c. The concave portion 52 opens to the axial right side at the center portion of the valve body 51. The communication path 51c penetrates in the axial direction at a position deviating in the radial direction in relation to the concave portion 52.

The concave portion 52 is formed in a truncated conical shape, that is, a circular shape when viewed from the axial direction and an isosceles trapezoidal shape when viewed from the radial cross-section. The concave portion 52 includes a flat surface 52a and a tapered surface 52b which is an inclined surface. The flat surface 52a extends to be substantially orthogonal to the axial direction. A tapered surface 53b has a diameter gradually increasing as it goes from the outer diameter side end portion of the flat surface 52a toward the axial right side. Further, an R surface 52c which is formed as a slightly curved surface is provided between the outer diameter side end portion of the tapered surface 52b and the axial right end surface of the valve body 51. In addition, the R surface 52c is preferably provided and may be a linear C surface.

As shown in FIGS. 2 and 3, the solenoid 80 mainly includes a casing 81, the center post 82 which is a fixed iron core, a rod 53, a movable iron core 84, a coil spring 85 which is a spring, an excitation coil 86, and a sleeve 87. The casing 81 includes an opening portion 81a which opens to the axial left side. The center post 82 is inserted into the opening portion 81a of the casing 81 from the axial left side and is formed in a substantially cylindrical shape to be fixed to the inner diameter side of the casing 81. The rod 53 is used for transmitting the driving force of the solenoid 80 to the valve body 51. The movable iron core 84 is sucked to the center post 82 when a current is applied to the solenoid 80. The coil spring 85 urges the movable iron core 84 toward the axial left side which is the valve opening direction of the valve 50. The coil 86 is wound on an outer bobbin of the center post 82. The sleeve 87 is formed in a bottomed cylindrical shape capable of accommodating a part of the center post 82, a part of the rod 53, the movable iron core 84, and the coil spring 85.

In the casing 81, the axial left end is provided with a concave portion 81b which is recessed toward the axial right side and the axial right end portion of the valve housing 10 is hermetically inserted and fixed to the concave portion 81b.

The center post 82 is formed of a rigid body which is a magnetic material such as iron or silicon steel. The center post 82 includes a cylindrical portion 82b and a flange portion 82d. The cylindrical portion 82b is provided with an insertion hole 82c which extends in the axial direction and into which the rod 53 is inserted. The flange portion 82d is formed in an annular shape which extends in the outer diameter direction from the outer peripheral surface at the axial left end portion of the cylindrical portion 82b.

Further, in a state in which the axial right end surface of the flange portion 82d comes into contact with the bottom surface of the concave portion 81b of the casing 81 from the axial left side, the concave portion 81b of the casing 81 is hermetically inserted and fixed to the concave portion 10c of the valve housing 10. Further, the flange portion 82d is sandwiched between the bottom surface of the concave portion 81b of the casing 81 and the bottom surface of the concave portion 10c of the valve housing 10 from both sides in the axial direction. In this way, the center post 82 is fixed to the valve housing 10.

The rod 53 is provided with a front end portion 54, a base portion 55, and a rear end portion 56 in order from the axial left side. The front end portion 54 serves as a guided convex portion which is relatively guided to the concave portion 52 which is a guide concave portion. In the present specification, the front end portion 54 is simply referred to as the convex portion 54.

Referring to FIG. 4, the convex portion 54 has a complementary shape to the concave portion 52 and is formed in a circular shape when viewed from the axial direction and an isosceles trapezoidal shape when viewed from the radial cross-section. The convex portion 54 includes a flat surface 54a and a tapered surface 54b which is an inclined surface. The flat surface 54a extends to be substantially orthogonal to the axial direction. The tapered surface 54b has a diameter gradually increasing as it goes from the outer diameter side end portion of the flat surface 54a toward the base portion 55. Further, the convex portion 54 is disposed on the axial left side in relation to the valve seat 10a (see FIGS. 2 and 3).

Returning to FIGS. 2 and 3, the base portion 55 is a columnar body extending in the axial direction of the convex portion 54 with a constant cross-section. The cross-sectional area of the base portion 55 is formed to be narrower than the cross-sectional area of the insertion hole 82c of the center post 82.

The cross-sectional area of the rear end portion 56 is formed to be narrower than the cross-sectional area of the base portion 55. Accordingly, the rear end portion 56 is inserted into a through-hole 84a of the movable iron core 84 together with the axial right end portion of the base portion 55 and the rod 53 is fixed to the movable iron core 84.

The axial right end of the movable iron core 84 is provided with a concave portion 84b which is recessed toward the axial left side. The coil spring 85 is disposed between the concave portion 84b and the bottom of the sleeve 87.

Next, the positional relationship between the valve body 51 and the rod 53 when the expansion valve V1 is assembled and when the solenoid 80 is energized or not energized will be described with reference to FIGS. 2 to 5.

First, the operation of assembling the expansion valve V1 will be described. Referring to FIGS. 2 and 3, the convex portion 54 of the rod 53 protruding from the center post 82 is inserted into the concave portion 52 of the valve body 51 when the valve housing 10 is assembled to the solenoid 80 as described above.

The valve body 51 before assembling sits on the valve seat 10a by the urging of the bellows 18. At this time, the axes of the valve body 51 and the concave portion 52 and the axis of the valve seat 10a are aligned and the axes of the valve body 51, the concave portion 52, and the valve seat 10a are aligned.

When the valve housing 10 is assembled to the solenoid 80, the convex portion 54 of the rod 53 is inserted into the concave portion 52 of the valve body 51 to come into contact therewith. Accordingly, it is easy to align the rod 53 and the valve body 51.

Further, the concave portion 52 and the convex portion 54 are fitted to each other in an assembled state. Accordingly, the rod 53 is separated from the inner peripheral surface of the insertion hole 82c of the center post 82 at a position substantially equal in the circumferential direction.

Next, a state in which the expansion valve V1 is not energized will be described. The rod 53 which is urged in the valve opening direction by the urging force $F_{sp}$ of the coil spring 85 is pressed against the valve body 51. Therefore, a state in which the convex portion 54 is fitted to the concave portion 52 is maintained.

In addition, the urging force $F_{bel}$ of the bellows 18 is stronger than the urging force $F_{sp}$ of the coil spring 85 (i.e., $F_{bel} > F_{sp}$) Therefore, when the solenoid 80 is not energized, the closed state of the valve 50 is maintained.

Further, a force caused by the differential pressure between the primary pressure and the secondary pressure is applied to the valve body 51 in addition to the urging force $F_{bel}$ of the bellows 18 and the urging force $F_{sp}$ of the coil spring 85. On the other hand, in this embodiment, the effective pressure receiving area of the bellows 18 and the effective pressure receiving area of the valve 50 are substantially the same. Further, the refrigerant flows from the secondary pressure chamber 13 into the space S1 through the communication path 51c of the valve body 51. Therefore, a force in which the valve body 51 is urged in the valve closing direction or the valve opening direction by the differential pressure is almost 0 (zero). In addition, the description of the force applied to the valve body 51 on the basis of the differential pressure between the primary pressure and the secondary pressure will be omitted below.

Next, a state in which the expansion valve V1 is energized will be described. When the solenoid 80 is energized, the driving force $F_{sol}$ of the solenoid 80 is applied to the urging force $F_{sp}$ of the coil spring 85 with respect to the rod 53 in the valve opening direction. When the resultant force applied in the valve opening direction exceeds the urging force $F_{bel}$ of the bellows 18, the valve body 51 strokes in the valve opening direction and separates from the valve seat 10a.

At this time, the rod 53 strokes in the valve opening direction together with the valve body 51 while the concave portion 52 of the valve body 51 and the convex portion 54 of the rod 53 are maintained in a fitted state.

Here, the tapered surface 52b of the valve body 51 and the tapered surface 54b of the rod 53 are formed to have substantially the same inclination angles, respectively. Therefore, the tapered surface 52b and the tapered surface 54b come into surface contact with each other. Accordingly, the tapered surface 52b and the tapered surface 54b can easily transmit the driving force $F_{sol}$ of the solenoid 80 from the rod 53 to the valve body 51.

Further, the flat surface 52a of the valve body 51 and the flat surface 54a of the rod 53 come into surface contact with each other. Therefore, the flat surface 52a and the flat surface 54a can easily transmit the driving force $F_{sol}$ of the solenoid 80 to the valve body 51. Further, the front end of the rod 53 is the flat surface 54a and the bottom of the valve body 51 disposed to be substantially in parallel to the flat surface 54a in a facing state is also the flat surface 52a. Accordingly, it is possible to prevent the convex portion 54 from being inseparably fitted to the concave portion 52.

When the valve body 51 moves away from the valve seat 10a, the valve body 51 is mainly supported by the bellows 18. Further, the rod 53 is supported by the sleeve 87 together with the movable iron core 84. That is, both the valve body 51 and the rod 53 are in a cantilever state.

Figure 5:
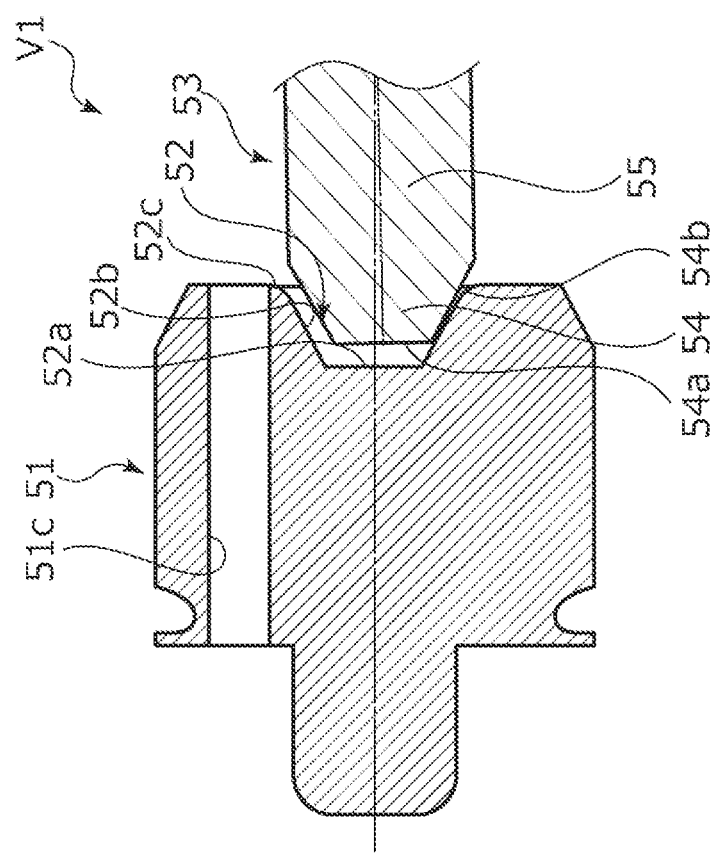
FIG. 5 is an enlarged cross-sectional view of a main part of the expansion valve in the first embodiment.

Accordingly, when a force acts in a direction in which the bellows 18 is bent in the radial direction and the movable iron core 84 is inclined with respect to the sleeve 87, the valve body 51 and the rod 53 arranged linearly may be bent in a polygonal line starting from the concave portion 52 and the convex portion 54 which are the contact portions. For example, as shown in FIG. 5, even when the rod 53 is slightly inclined so that the axis of the concave portion 52 and the axis of the convex portion 54 relatively deviate from each other, the convex portion 54 of the rod 53 is guided along the concave portion 52, specifically, the tapered surface 54b of the convex portion 54 is guided along the tapered surface 52b of the concave portion 52. Accordingly, the rod 53 and the valve body 51 are arranged substantially linearly as indicated by the one-dotted chain line in FIG. 4. Additionally, the bending of the valve body 51 and the rod 53 is exaggerated for convenience of explanation in FIG. 5.

In this way, even when the valve body 51 is separated from the valve seat 10a while the valve 50 is opened, the valve body 51 and the rod 53 are maintained substantially linearly. Therefore, the valve body 51 and the rod 53 can maintain the valve opening degree according to the driving force $F_{sol}$ of the solenoid 80.

After that, when the current is weakened or not supplied, the rod 53 strokes in the valve closing direction together with the valve body 51 while the concave portion 52 of the valve body 51 and the convex portion 54 of the rod 53 are maintained in a fitted state.

As shown in FIG. 2, the maximum stroke ST of the movable iron core 84, that is, the maximum stroke ST of the rod 53 while the concave portion 52 and the convex portion 54 are fitted to each other is shorter than the dimension L in which the concave portion 52 and the convex portion 54 overlap each other in the axial direction (i.e., ST<L). Therefore, even when the rod 53 strokes in the valve opening direction or strokes in the valve closing direction, the convex portion 54 does not easily escape from the concave portion 52.

Further, the coil spring 85 is disposed and the convex portion 54 is maintained in a fitted state to the concave portion 52 by the urging force $F_{sp}$ thereof. Therefore, the relative movement of the valve body 51 and the rod 53 in the separation direction is suppressed. Accordingly, it is possible to maintain the valve opening degree according to the driving force $F_{sol}$ of the solenoid 80.

Further, the convex portion 54 having a cross-sectional area narrower than that of the base portion 55 of the rod 53 is fitted to the concave portion 52. Accordingly, it is possible to obtain a compact configuration in which the valve body 51 and the rod 53 are fitted to each other. Therefore, it is possible to reduce the influence on the flow of the refrigerant even when the relative movement of the valve body 51 and the rod 53 in the separation direction is slightly generated.

Further, a gap G is formed between the rod 53 and the center post 82 with reference to FIGS. 2 and 3. Therefore, contamination is less likely to be caught between the rod 53 and the center post 82 due to the stroke of the rod 53. The gap G is wider than the minute gap between the rod and the bearing as shown in the conventional literature. Accordingly, contamination is less likely to be caught between the rod 53 and the center post 82 as compared with the rod and the bearing as shown in the conventional literature.

Further, the axis of the valve body 51 and the axis of the rod 53 are aligned by the concave portion 52 and the convex portion 54. Accordingly, the large inclination of the rod 53 with respect to the center post 82 is prevented. Therefore, the gap G which is the substantially same distance in the circumferential direction prevents contamination from being caught.

In addition, the refrigerant flows out from the gap G into the secondary pressure chamber 13 due to the stroke of the rod 53 in the valve opening direction. Accordingly, it is possible to discharge contamination sucked into the gap G.

Further, the refrigerant can easily pass through the gap G. Accordingly, the rod 53 capable of promptly obtaining a force applied from the refrigerant flowing the back surface side in relation to the rod 53 during the stroke of the rod 53 easily maintains the force based on the differential pressure described above at almost 0 (zero). By forming the gap G in this way, it is easy to stabilize the stroke of the rod 53 with respect to the current applied to the solenoid 80.

As described above, when the rod 53 strokes toward the valve body 51, the rod 53 is relatively guided in the fitting direction by the concave portion 52. Therefore, it is possible to maintain the radial deviation of the valve body 51 with respect to the valve seat 10a in an allowable range while ensuring the gap G between the center post 82 and the rod 53. Accordingly, it is possible to suppress contamination from being caught between the center post 82 and the rod 53.

Further, the concave portion 52 is provided with the tapered surface 52b. Therefore, it is possible to simply form the guide concave portion.

Further, the concave portion 52 is provided with the R surface 52c. Accordingly, damage due to mutual contact is less likely to occur compared to a configuration in which the tapered surface 52b of the concave portion 52 and the axial right end surface of the valve body 51 form a corner when the convex portion 54 is inserted into the concave portion 52.

In addition, an example has been described in which the flat surfaces 52a and 54a of the concave portion 52 and the convex portion 54 come into surface contact with each other while the concave portion 52 and the convex portion 54 are fitted to each other, but the present invention is not limited thereto. The tapered surfaces 52b and 54b may come into surface contact with each other and the flat surfaces 52a and 54a may be separated from each other. In such a separation case, the top of the convex portion and the bottom of the concave portion may not be flat.

Further, the flat surface 54a of the convex portion 54 and the flat surface 52a of the concave portion 52 may come into surface contact with each other and the tapered surface 52b of the concave portion 52 and the tapered surface 54b of the convex portion 54 may be slightly separated from each other while the concave portion 52 and the convex portion 54 are fitted to each other. In addition, the tapered surface 52b and the tapered surface 54b may come into contact with each other in at least one position in the circumferential direction while the top of the convex portion and the bottom of the concave portion come into contact with each other.

Second Embodiment

An expansion valve as a valve according to a second embodiment of the present invention will be described with reference to FIG. 6. In addition, the description of the overlapping configuration in the same configuration as that of the first embodiment will be omitted.

Figure 6:
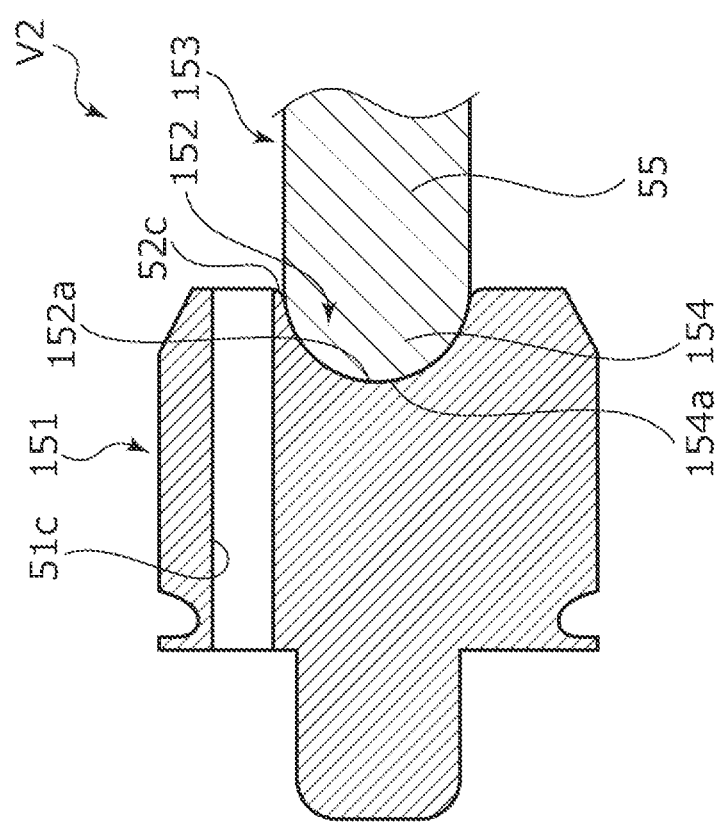
FIG. 6 is an enlarged cross-sectional view of a main part of an expansion valve as a valve according to a second embodiment of the present invention.

As shown in FIG. 6, in an expansion valve V2 in the second embodiment, a concave portion 152 of a valve body 151 is provided with a semispherical surface 152a which is a part of a spherical surface having a diameter gradually decreasing in a curved state as it goes from the axial left end of the R surface 52c toward the axial left side. Further, a convex portion 154 of a rod 153 is provided with a semispherical surface 154a which is a part of a spherical surface having a diameter gradually decreasing in a curved state as it goes from the axial left end of the base portion 55 toward the axial left side.

The semispherical surface 152a and the semispherical surface 154a are formed to have the same curvature. Therefore, the semispherical surface 152a and the semispherical surface 154a enable the accurate relative alignment between the axis of the concave portion 152 and the axis of the convex portion 154. Further, the semispherical surface 152a and the semispherical surface 154a can come into surface contact with each other. Therefore, the semispherical surface 152a and the semispherical surface 154a can easily transmit the driving force $F_{sol}$ of the solenoid 80 to the valve body 151.

Further, the convex portion 154 of the rod 153 without a corner is less likely to be damaged due to a mutual contact.

Third Embodiment

An expansion valve as a valve according to a third embodiment of the present invention will be described with reference to FIG. 7. In addition, the description of the overlapping configuration in the same configuration as those of the first and second embodiments will be omitted.

Figure 7:
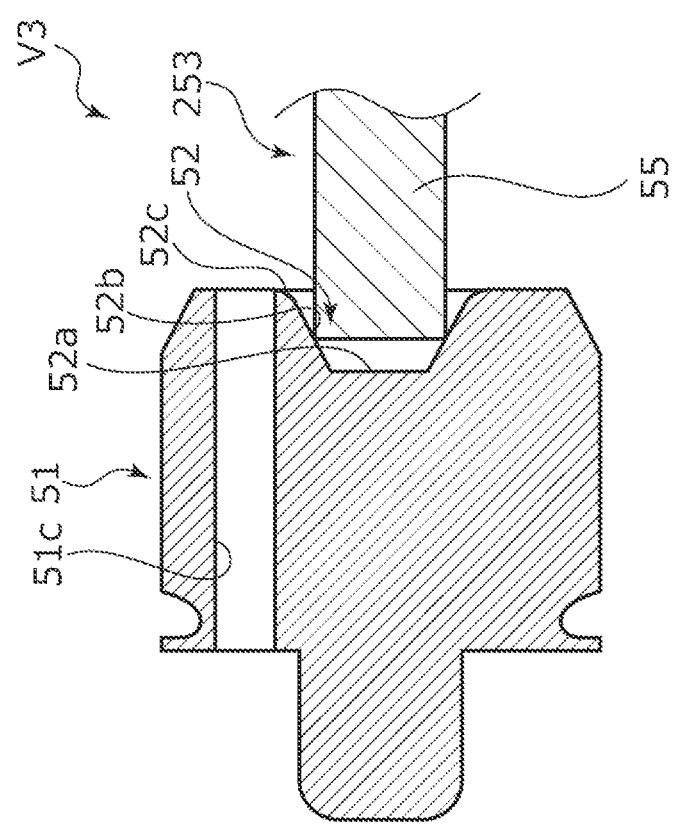
FIG. 7 is an enlarged cross-sectional view of a main part of an expansion valve as a valve according to a third embodiment of the present invention.

As shown in FIG. 7, in an expansion valve V3 in the third embodiment, a rod 253 includes a base portion 55 and a rear end portion 56. In this way, even when a guided convex portion is not formed, the base portion 55 is guided to the tapered surface 52b of the concave portion 52. Accordingly, the rod 53 can be smoothly guided with respect to the valve body 51. In this way, even when the guided convex portion is not inserted into the guide concave portion, this is included in the present invention.

Further, since the guided convex portion is not formed, it is possible to simplify a configuration in which the valve body 51 and the rod 253 are fitted to each other.

Further, the corner of the base portion 55 comes into line contact with the tapered surface 52b of the concave portion 52. Therefore, it is possible to transmit the driving force $F_{sol}$ of the solenoid 80. In addition, the corner of the base portion 55 is preferably provided with a minute R surface or C surface.

In addition, an example has been described in which the corner of the base portion 55 and the tapered surface 52b of the concave portion 52 come into line contact with each other while the base portion 55 is fitted to the concave portion 52, but the present invention is not limited thereto. That is, the axial left end surface of the base portion 55 and the flat surface 52a of the concave portion 52 may come into surface contact with each other and the tapered surface 52b of the concave portion 52 and the outer peripheral surface of the base portion 55 may be separated from each other.

Figure 8:
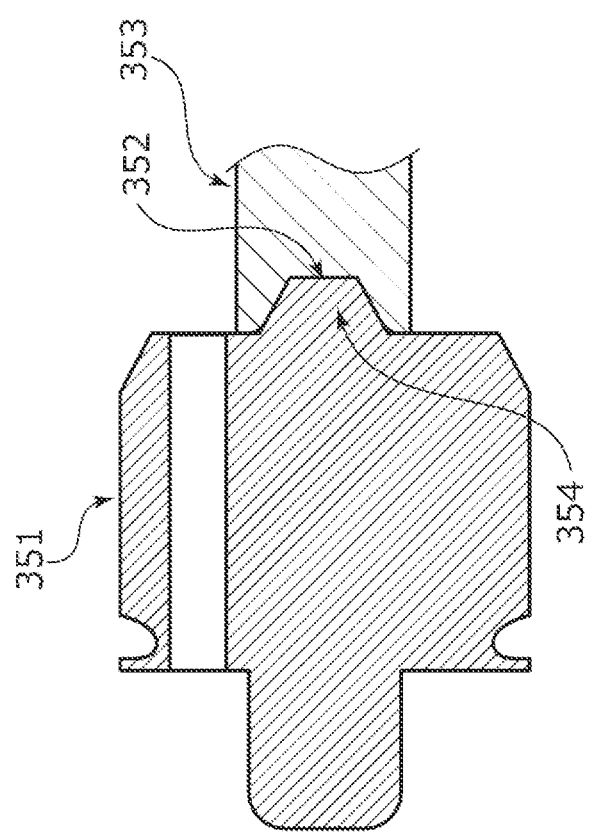
FIG. 8 is an enlarged cross-sectional view of a main part of a first modified example of the expansion valve according to the present invention.
Figure 9:
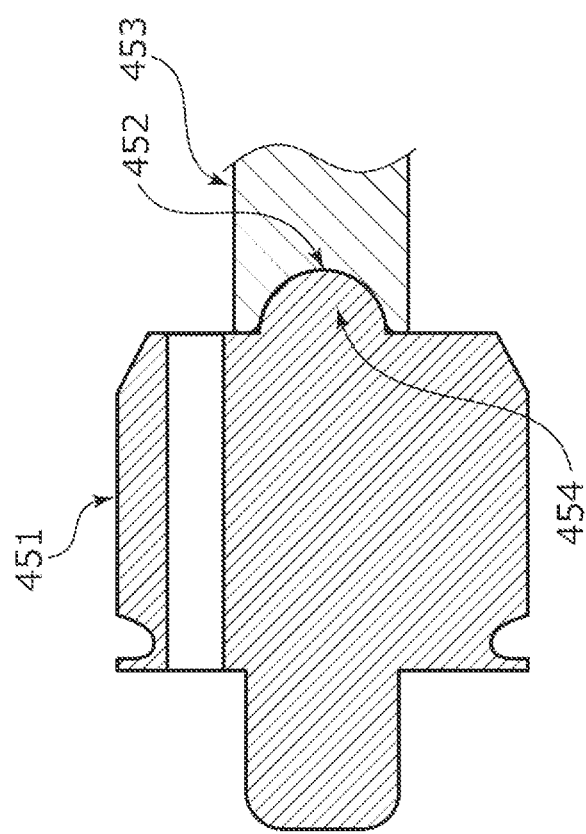
FIG. 9 is an enlarged cross-sectional view of a main part of a second modified example of the expansion valve according to the present invention.
Figure 10:
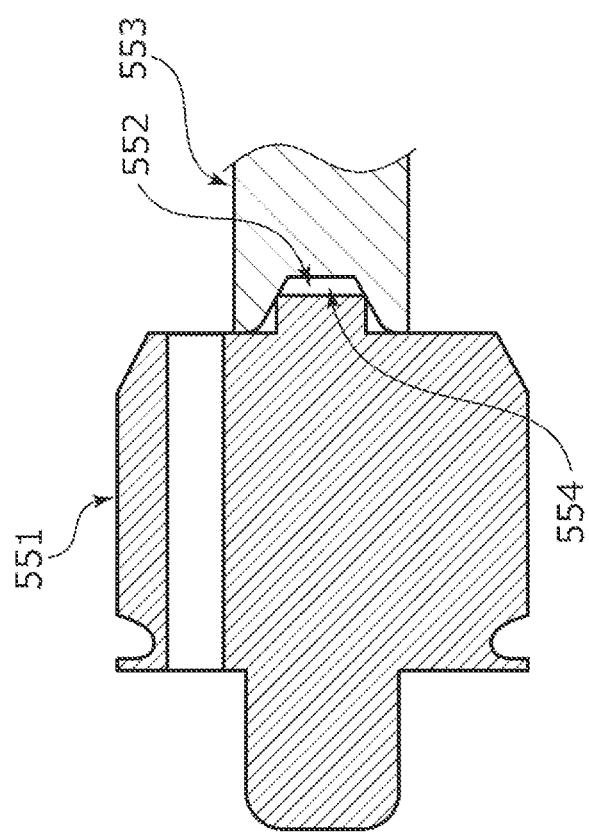
FIG. 10 is an enlarged cross-sectional view of a main part of a third modified example of the expansion valve according to the present invention.

Here, each of modified examples of the first to third embodiments will be described. In the first to third embodiments, an example has been described in which the expansion valves V1 to V3 are formed such that the valve bodies 51 and 151 are provided with the concave portions 52 and 152 and the rods 53 and 153 are provided with the convex portions 54 and 154, but the present invention is not limited thereto. That is, as shown in the first to third modified examples of FIGS. 8 to 10, rods 353, 453, and 553 may be provided with concave portions 352, 452, and 552 and valve bodies 351, 451, and 551 may be provided with convex portions 354, 454, and 554.

Although the embodiments of the present invention have been described above with reference to the drawings, the specific configuration is not limited to these examples and is included in the present invention even if there are changes or additions within the scope of the present invention.

For example, in the first to third embodiments, an example has been described in which the valve body and the rod are maintained in a fitted state while the valve is closed, but the present invention is not limited thereto. That is, the rod may escape from the valve body while a part of the rod comes into contact with the valve body or the entire rod is separated therefrom in the valve closed state.

Further, in the first to third embodiments, an example has been described in which the valve body is provided with the through-hole, but the present invention is not limited thereto. That is, the valve body may not be provided with the through-hole.

Further, in the first to third embodiments, an example has been described in which the guide concave portion has a circular shape when viewed from the axial direction, but the present invention is not limited thereto. That is, the guide concave portion may have a polygonal shape when viewed from the axial direction or an annular shape when viewed from the axial direction or a plurality of concave portions may be arranged concentrically and equally or the configuration may be appropriately changed. Similarly, the guided convex portion may be also formed in an annular shape when viewed from the axial direction or a plurality of convex portions may be arranged concentrically and equally or the configuration may be appropriately changed.

Further, in the first to third embodiments, an example has been described in which the rod is integrally provided with the front end portion, the base portion, and the rear end portion, but the present invention is not limited thereto. That is, the rod may be a plurality of members such that the front end portion formed as a separate member is fixed to the base portion or the like.

Further, in the first to third embodiments, an example has been described in which the urging member is exemplified as the bellows having a sealing function, but the present invention is not limited thereto. That is, the urging member may be an urging member without a sealing function, for example, a coil spring.

Further, in the first to third embodiments, an example has been described in which the urging member is exemplified as the push spring urging the valve body in the extension direction thereof, but the present invention is not limited thereto. That is, the urging member may be a pull spring.

REFERENCE SIGNS LIST

10 Valve housing
10a Valve seat
18 Bellows (urging member)
50 Valve
51 Valve body
52 Concave portion (guide concave portion)
52a Flat surface
52b Tapered surface (inclined surface)
53 Rod
54 Front end portion, convex portion (guided convex portion)
54a Flat surface
54b Tapered surface (inclined surface)
80 Solenoid (drive source)
82 Center post (fixed iron core)
84 Movable iron core
85 Coil spring (spring)
86 Coil
151 Valve body
152 Concave portion (guide concave portion)
152a Semispherical surface (part of spherical surface)
153, 253 Rod
154 to 554 Convex portion (guided convex portion)
154a Semispherical surface (part of spherical surface)
351 to 551 Valve body
352 to 552 Concave portion (guide concave portion)
353 to 553 Rod
354 to 554 Convex portion (guided convex portion)
C Compressor
G Gap
H1 Heat exchanger (condenser for heating, evaporator for cooling)
H2 Heat exchanger (evaporator for heating, condenser for cooling)
R Refrigeration cycle
V1 to V3 Expansion valve (valve)

The invention claimed is:

1. A valve, comprising:
a valve housing;
a rod configured to be movable inside the valve housing;

a valve body having a first end portion which is engaged with an axial end of the rod, a second end portion which is opposed to the first end portion in an axial direction and pivotably supported, and no sliding surface between the first end portion and the second end portion;

a valve seat configured to have the valve body seated thereon;

a cylindrical member having an insertion hole through which the rod is inserted;

a drive source configured to drive the valve body through the rod; and an urging member configured to urge the valve body in a direction opposite to a driving direction of the drive source, wherein a gap is formed between an outer peripheral surface of the rod and an inner surface of the cylindrical member throughout an entire circumference, and one of the valve body and the rod includes a guide concave portion configured to guide remaining one of the valve body and the rod in a relative fitting direction in which the valve body and the rod are fitted to each other.

2. The valve according to claim 1,
wherein the guide concave portion includes an inclined surface.

3. The valve according to claim 2, further comprising:
a spring configured to urge the rod toward the valve body.

4. The valve according to claim 1,
wherein the remaining one of the valve body and the rod includes a guided convex portion which is fitted to the guide concave portion.

5. The valve according to claim 4,
wherein each of the guide concave portion and the guided convex portion includes an inclined surface.

6. The valve according to claim 5,
wherein the inclined surface of the guide concave portion and the inclined surface of the guided convex portion are equal to each other in inclination angle with respect to an axial direction.

7. The valve according to claim 6,
wherein each of the guide concave portion and the guided convex portion includes a flat surface which is orthogonal to an axial direction.

8. The valve according to claim 6, further comprising:
a spring configured to urge the rod toward the valve body.

9. The valve according to claim 5,
wherein each of the inclined surfaces of the guide concave portion and the guided convex portion is part of a spherical surface defined by one mutual curvature.

10. The valve according to claim 9, further comprising:
a spring configured to urge the rod toward the valve body.

11. The valve according to claim 5,
wherein each of the guide concave portion and the guided convex portion includes a flat surface which is orthogonal to an axial direction.

12. The valve according to claim 5, further comprising:
a spring configured to urge the rod toward the valve body.

13. The valve according to claim 4,
wherein each of the guide concave portion and the guided convex portion includes a flat surface which is orthogonal to an axial direction.

14. The valve according to claim 13, further comprising:
a spring configured to urge the rod toward the valve body.

15. The valve according to claim 4, further comprising:
a spring configured to urge the rod toward the valve body.

16. The valve according to claim 1, further comprising:
a spring configured to urge the rod toward the valve body.

* * * * *